Sept. 1, 1970     J. V. SCHWEPPE ET AL     3,526,488
GLASS FIBER FORMING APPARATUS
Filed April 4, 1967     3 Sheets-Sheet 1
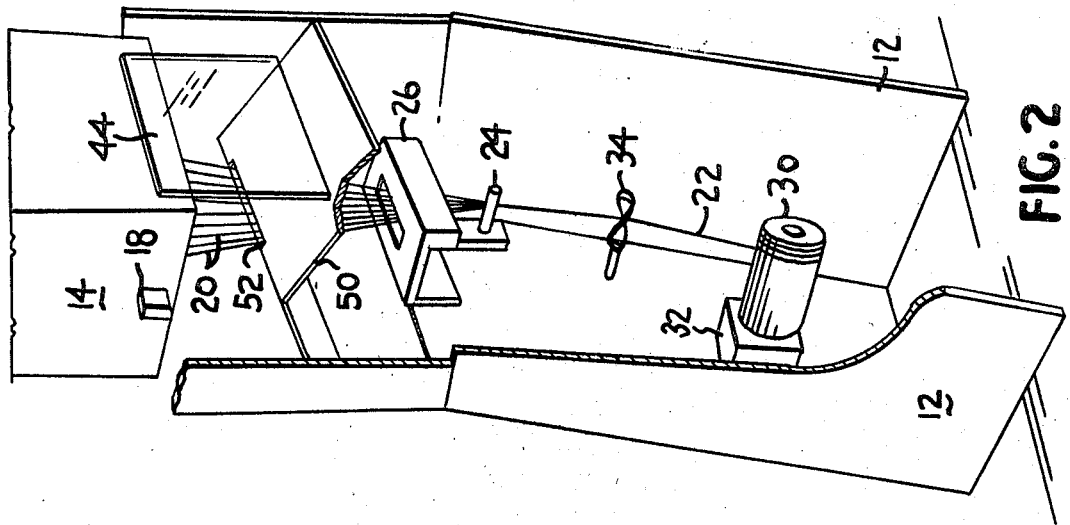
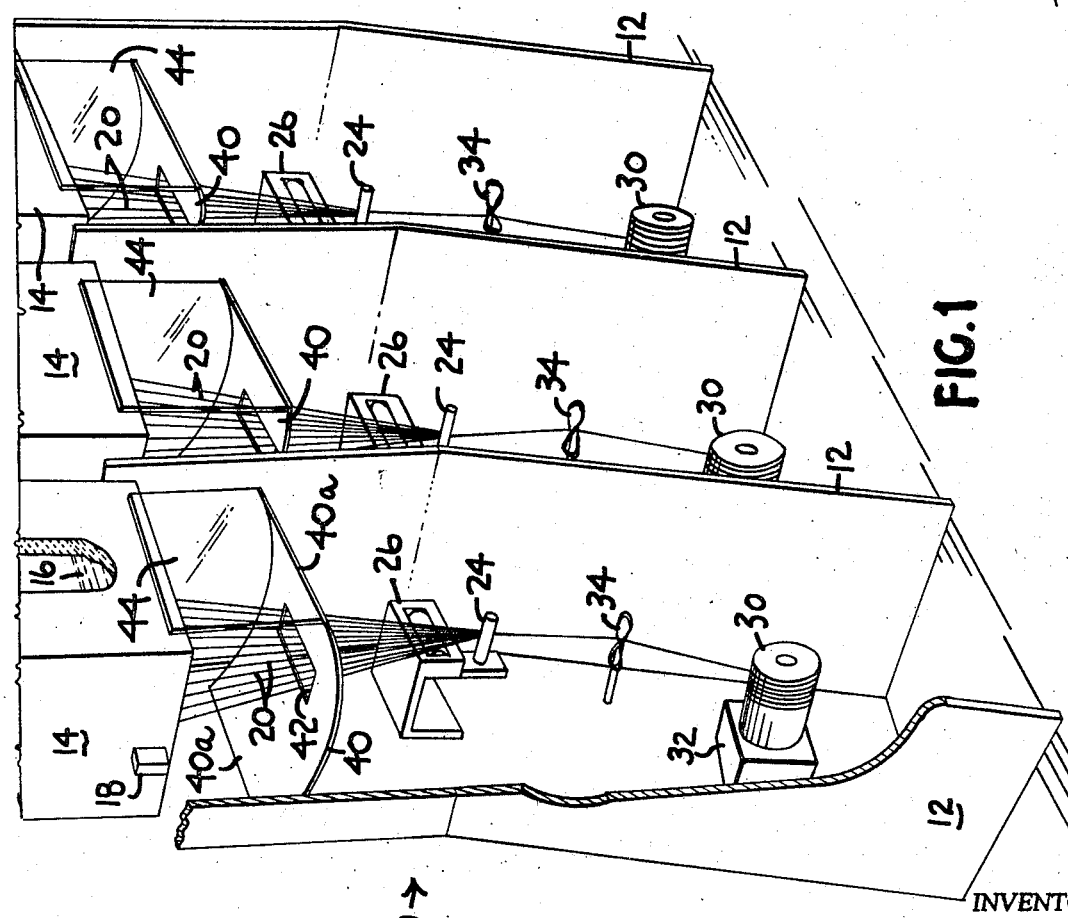
INVENTORS
JOHN V. SCHWEPPE and
NORMAN P. BELL
BY Chisholm and Spencer
ATTORNEYS

United States Patent Office

3,526,488
Patented Sept. 1, 1970

3,526,488
GLASS FIBER FORMING APPARATUS
John V. Schweppe and Norman P. Bell, Shelby, N.C., assignors to PPG Industries Inc., Pittsburgh, Pa., a corporation of Pennsylvania
Filed Apr. 4, 1967, Ser. No. 628,443
Int. Cl. C03b 37/02
U.S. Cl. 65—11                          4 Claims

ABSTRACT OF THE DISCLOSURE

A baffle or shield member having its major portions angled with respect to the horizontal and having a centrally located opening for the passage of glass filaments or fibers being produced is disposed between the fiber forming bushing and the winder. By using this arrangement, the stability of the filament forming process is enhanced.

BACKGROUND OF THE INVENTION

This invention relates to the production of thermoplastic, continuous filament fibers and in particular to improvements in the manufacture of continuous filament glass fibers.

Continuous filament glass fibers have been produced according to the process disclosed in U.S. Pat. No. 2,291,289. In this process, molten glass is contained in a platinum alloy, trough-like chamber known as a bushing. The bushing is electrically heated by passing electric current through it and the glass is heated by contact with the hot bushing. The bushing contains a plurality of orifices in its bottom with cylindrical, hollow tips projecting downwardly from the bottoms of the bushing in line with the orifices to deliver the glass. The glass is pulled from the tips into fine, continuous filaments and collected as a package by a winder. The filaments are passed over a binder applicator where a binder is applied to each and then over a gathering guide or shoe where they are grouped into a strand before being collected on the winder.

The critical point in the fiber forming process is the zone in which the fibers are pulled from the bushing tips and attenuated rapidly to form the very fine filaments. The molten glass froms as an inverted cone at the bushing tips and a filament is pulled from each cone apex at a rate of 2 to 3 miles per minute or more. The diameter of the cone or glass at its base is of the order of 0.075 inch or less and the diameter of the filaments produced is of the order of 5 to 20 microns or less.

In order to accomplish the formation of the very fine filaments of substantially uniform diameter throughout their lengths and reduce yardage variations in the strand or yarn as packaged, it is necessary to establish substantially uniform conditions in the zone in which the glass fibers are formed. By the expression "yardage variations" is meant a variation in the weight of strand for a given length, or, in other words, a variation in diameter of the strand along its length, generally caused especially by temperature fluctuations in the critical fiber forming zone.

Accelerated controlled cooling of the glass in the cones has been accomplished by directing cool air against the cones, enveloping the cones in the zone of their formation with cool air and by placing radiant heat absorbing fins between the rows of bushing tips adjacent the cones. Each of these arrangements will accomplish the desired results and have been successfully used in the production of glass fibers. However, they do not solve the problem of atmospheric fluctuations beneath the bushing. Atmospheric fluctuations are caused by temperature fluctuations and humidity fluctuations in the critical fiber forming zone. Temperature fluctuations can be caused by air flow into the critical zone of fiber formation. For example, the downward travel of air with the filament induces air flow into the zone and with such air can be foreign material, such as dirt, binder, etc., present in the forming area. Also, the winder which generally includes a rotating drum or collet acts as a pump, pumping air which may contain foreign material back into the bushing zone. Probably this is the main source of fluctuations in the forming zone. As the air flowing into the critical fiber forming zone originates from different areas, the temperature varies, so that the cooling effect on the fibers also varies. Much water is used to clean parts of equipment at various times during the fiber forming process so that the humidity can vary from time to time. Such variation is reflected in the critical zone because of air flow therein.

By following the teachings of the present invention, the stability of the fiber forming process is materially improved and yardage variations are materially reduced. Thus the primary object of this invention is to provide an improved method and apparatus for forming continuous filaments in a stable, controlled manner.

SUMMARY OF THE INVENTION

The apparatus of this invention includes a baffle or shield member having at least angularly positioned major portions and a centrally located opening for the passage of a fan of filaments located adjacent the filament forming bushing, as for example 12 to 16 inches therebelow. The shield which is constructed of an air impervious material spans the opening between adjacent fiber forming position dividers, which are those members, usually of sheet metal, separating fiber forming positions. The baffle or shield may also be made of sheet metal, as for example galvanized steel or stainless steel and may be substantially U-shaped with the bottom of the U facing downwardly or V-shaped with the apex of the V facing upwardly. Horizontal members, for some reasons or other, are not desirable inasmuch as they do not improve the fiber forming operation.

In addition to the above, the space between the front of the shield and the bushing may receive a viewing glass, but this is not necessary. No cooling air is fed into the space adjacent the bushing, nor is the shield cooled by directing air or cooling fluid thereon, it having been found that such cooling is not necessary. However, various cone cooling means are generally used in the conventional manner.

While the function of the shield is not completely understood, it is theorized that the shield materially decreases fluctuations in temperature, air currents and moisture adjacent the bushing and provides a more stable fiber forming zone, even though the temperature in the zone may be above that in the comparable zone of a fiber forming apparatus in which shields are not used. It is also theorized that horizontal or flat shields reflect heat from the bushing back to the bushing and materially change the thermal conditions which are so important for fiber forming. In any event, the V-shaped shield with the apex of the U in the uppermost position performs the best of the various arrangement. The legs of the U may extend from side-to-side or from front-to-back without change in operating characteristics.

DESCRIPTION OF THE DRAWINGS

FIG. 1 is view of a fiber forming apparatus including several fiber forming positions showing one embodiment of stabilizer in operating position;

FIG. 2 is view of a fiber forming position showing another embodiment of stabilizer in operating position;

DESCRIPTION OF THE PREFERRED EMBODIMENTS

Figure 3:
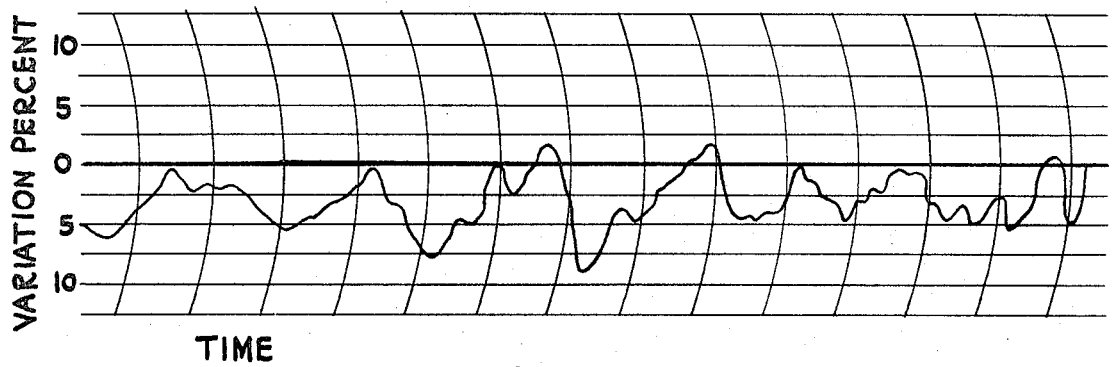
FIG. 3 is a graph with yardage variation in weight plotted against time for a bushing position operating without a stabilizer shield.

Looking now at the drawings, and especially at FIG. 1, there is illustrated a fiber forming apparatus generally identified at 10 including a plurality of fiber forming positions, each defined, at least in part, by position dividers 12, which are usually of sheet metal extending from a position adjacent a bushing 14 to the floor 16 of the fiber forming room. The bushings 14 each contain a body of molten glass 16 received from a continuous melting furnace (not shown) or by the feeding of marbles therein. The bushing generally made of a platinum-rhodium alloy is heated electrically through bus bars 18 (only one of which is shown), so as to maintain the glass therein at the proper drawing temperature. In accordance with standard practice, the bushing is provided with a plurality of orifices or tips through which glass flows to form individual filaments 20 which are grouped together as a strand 22 by a gathering shoe 24 shown here as a substantially rod-shaped member having a slot therein. Carbon or graphite makes a good gathering shoe-gathering surface. Before being grouped into a strand 22 by the gathering shoe 24, a binder is applied to the individual fibers by passing the filaments over a binder applicator 26 of conventional construction. The binder applicator illustrated includes a rotating member having a continuous film of binder thereon for transfer to the filaments.

The strand is then wound as a package 30 on a rotating tube carried by the rotating collect of a winder, generally identified as 32. In order to distribute the strand on the package, a rotating traversing cam 34 is used.

All the parts just described are standard and known to those skilled in the art.

In accordance with the teachings of this invention, a stabilizing shield 40 is positioned below the bushing 14 and above the binder applicator 26 and spans the space between adjacent position dividers 12. In FIG. 1 the shield 40 is shown as being substantially U-shaped in section having its major portions 40a, 40a, angled upwardly from the horizontal. A centrally located opening 42 is provided for the passage of the filaments. Generally, with the bushabout 8 feet from the floor, the shield 40 is, at its lowermost portion about 12 to 16 inches below the bushing. In addition to the apparatus just described, a view glass 44 can be provided at the front of the apparatus extending upwardly from the shield 40. This shield is primarily for the protection of the operator who must stand in front of the apparatus and handle the fibers, etc.

FIG. 2 illustrates another embodiment of the invention. Here the stabilizer shield 50 is an inverted V, the apex being upward. A central opening 52 is provided for passage of the fibers. The same parts of the fiber apparatus are present as in FIG. 1 and are so identified with the same reference characters. The difference is in the shape and disposition of the shield 50 and also the view glass, when used, may not reach to the shield. The major portions of the shield 50 are angled approximately 20° to the horizontal; however, this angle is not critical.

The stabilizing shield 40 shown in FIG. 1 and the stabilizing shield 50 shown in 50, each have angularly disposed major portions which diverge from the central openings 42 and 52, respectively, therein; and, as well, away from the path of movement of the fibers passing therethrough, as shown in FIG. 1 and FIG. 2.

Not shown are water hoses used by the operator to hose down the position dividers and floor in order to remove waste fibers therefrom. The use of water for this purpose adds to the moisture in the atmosphere. Because the use of water varies, moisture conditions also vary.

As stated previously, the winder acts as a pump, pumping air and moisture upwardly toward the bushing. The shield effectively reduces, if not entirely eliminates, this upward flow and stabilizes the atmosphere in the zone defined thereby with the bushing, which zone is protected from the atmosphere around the apparatus and is that of fiber formation.

Figure 4:
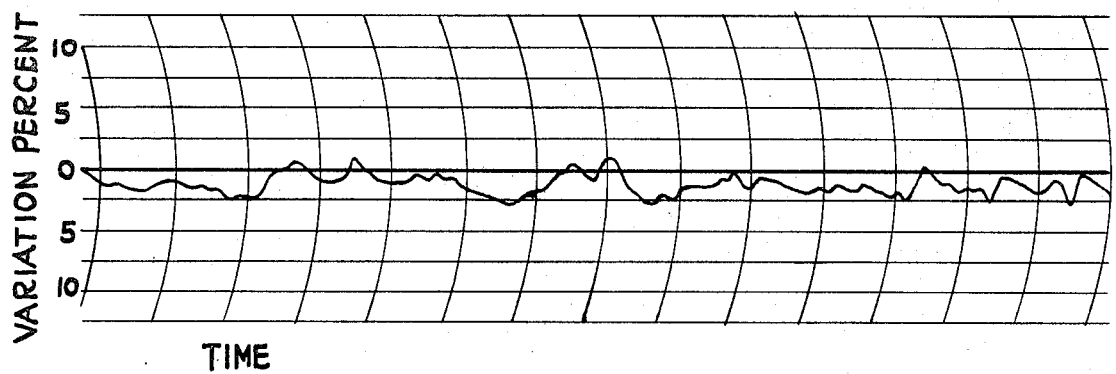
FIG. 4 is a graph similar to that of FIG. 3 but for a bushing position operating with a stabilizer shield.
Figure 5:
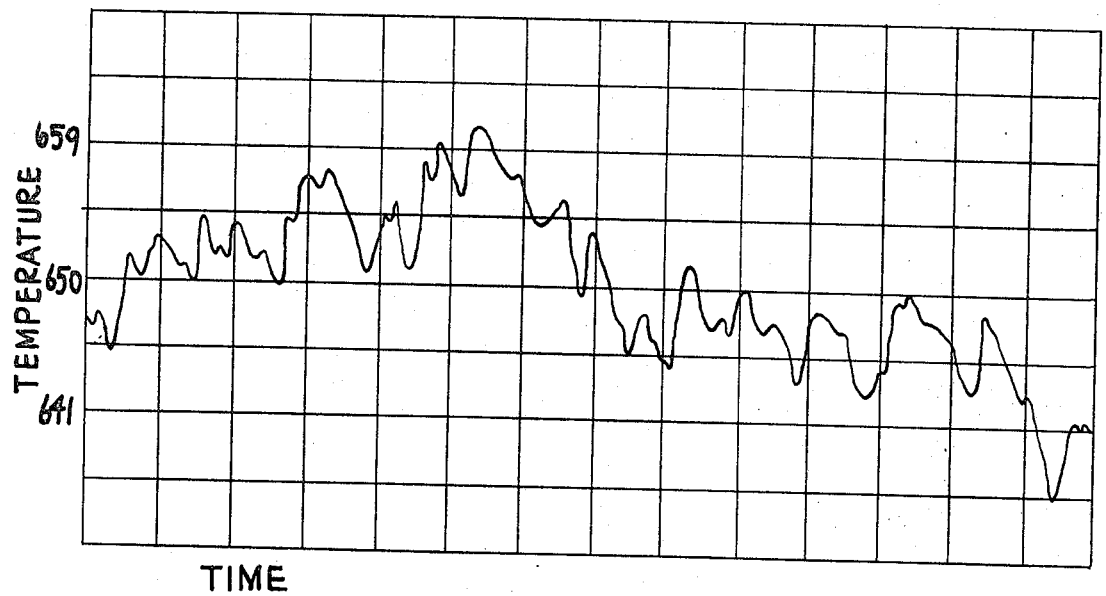
FIG. 5 is a graph of temperature plotted against time for a bushing position operating without a stabilizer shield.
Figure 6:
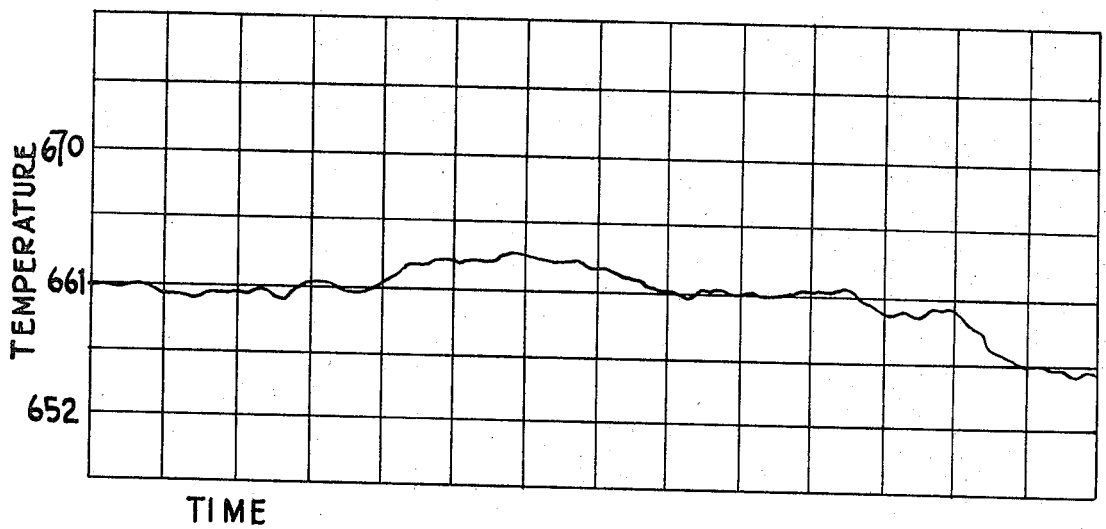
FIG. 6 is a graph similar to that of FIG. 5 but for a bushing position operating with a stabilizer shield.

In the past, it has been considered that lowering the temperature in the zone of fiber formation improved the process. However, to rebut this contention, attention is directed to FIGS. 3 to 6 inclusive. FIGS. 3 and 5 are graphs from data collected from a fiber forming apparatus without this invention; FIGS. 4 and 6 are similar graphs on the same apparatus using this invention.

If we compare FIGS. 3 and 4, we see that for a period of time the yardage variation indicated in FIG. 3 varies as much as about 8%, from the norm, while that indicated in FIG. 4 varies not over 3% from the norm, the norm being indicated by 0 in the graph. Thus it can be concluded that the variations in fiber diameter are reduced materially when using this invention. However, it can also be seen from a comparison of FIGS. 5 and 6 that while the temperature in the fiber forming zone using this invention is above that when not using the invention, the variations in temperature are much reduced, for example the variation shown by the graph of FIG. 5 is as much as 25° F. while that shown in the graph of FIG. 6 is at most 8° F.

We claim:
1. In apparatus for forming continuous filaments from molten glass which includes a bushing having molten glass therein and orifices therethrough for the passage of molten glass forming cones from which the filaments are drawn in a zone of fiber formation, a binder applicator over which the filaments are passed, a gathering shoe to group said filaments into a strand and a rotating winder for collecting said strand and applying the drawing force to the glass, said winder pumping air upwardly into said zone of fiber formation, said zone of fiber formation being subjected to atmospheric fluctuations because of air flow and moisture therein, the improvement which comprises,
    a shield of material impervious to air having angularly oriented major portions and a centrally located opening for the passage of filaments therethrough positioned at a location in advance of that at which said filaments are grouped into a strand, said air-impervious shield being located between said bushing and said applicator, said zone of fiber formation being protected from the atmosphere around said apparatus, and each of said major portions of said shield diverging away from said central opening and the path of movement of the filaments passing therethrough,
    said shield being positioned to block the upward flow of air having particulate matter suspended therein into said zone of fiber formation and to reduce fluctuations in atmospheric conditions in said zone, thus improving the stability of the fiber forming process.

2. In apparatus as recited in claim 1 including a plurality of fiber forming positions, each including a bushing, a binder applicator, a gathering shoe and a winder and each position being separated from the next adjacent position by a gas impervious divider, and such position including a shield spanning the space between adjacent dividers.

3. In apparatus as recited in claim 1 wherein said shield has portions which are angled upwardly from the horizontal.

4. In apparatus as recited in claim 1 wherein said shield has portions which are angled downwardly from the horizontal.

References Cited

UNITED STATES PATENTS

| 3,304,163 | 2/1967 | Holschlag | 65—2 XR |
| 3,406,021 | 10/1968 | Day et al. | 65—1 |

S. LEON BASHORE, Primary Examiner

R. L. LINDSAY, Jr., Assistant Examiner

U.S. Cl. X.R.

65—2